Patented Mar. 12, 1935

1,994,381

UNITED STATES PATENT OFFICE 1,994,381

COLD WEATHER TUBE

Leo L. Beck, Westfield, N. J., assignor to Claude Neon Lights, Inc., New York, N. Y., a corporation of New York No Drawing. Application June 26, 1929,
Serial No. 373,917

7 Claims. (Cl. 176—122)

This invention relates to luminous tubes having mercury therein which is in sufficient quantity to the other gaseous contents of the tube such that the characteristic blue color of luminous mercury vapor is emitted and the colors of the other gas or gases is masked by the blue. Such a tube may be a neon mercury tube but the disadvantages of a tube having these two elements is that when the tube envelope becomes cold as in an outdoor advertising sign during cold weather, the mercury condenses and the tube becomes striated or streaked with the characteristic neon red color. It is for this reason that I devised the gaseous content for luminous tubes to be used where low temperatures prevail described in my co-pending application Serial No. 241,277 filed December 19, 1927 and the present disclosure is in the nature of a species of the broad invention there described.

In the application referred to helium, neon and argon are used with mercury to form a gaseous mixture which would continue to emit a mercury blue color at low temperatures and it is an object of this invention to substitute krypton or xenon for the argon in the gaseous mixture of helium, neon, mercury vapor and argon or a low voltage gradient rare gas, disclosed in that application.

The helium provided in the luminous tube is an inefficient gas and heats when luminous yet this is a desirable characteristic since the heat developed maintains the mercury in its vapor state and counteracts the cooling of the exterior temperature. Krypton or xenon each of which being a gas having a low voltage gradient is supplied in order to improve the efficiency of the gaseous content of the tube and neon is also furnished in order to raise the pressure of the gases within the range of pressures best suited for the operation of a luminous tube or if the tube is to be operated at lower exterior temperatures, the pressure may be increased. The increased pressure is obtained by adding neon to the gaseous contents of the tube.

The characteristic color of krypton when luminous is a bluish white which is advantageous for the reason that should the mercury condense from its vapor and tend thereby to cause striations in the tube light, the bluish tinge of the krypton will tend to counteract this effect and maintain a bluish color throughout the tube even though some condensation of mercury has occurred. Krypton in addition is a relatively heavy gas and therefore carries the mercury better than a lighter gas.

The helium, neon, and mercury vapor function in the same manner and produce the same results set out in my copending application and therefore a detailed description of the desirable characteristics of these gases will not be given herein. However, it will be seen that the temperature of the positive column tube is controlled and prevented from falling below a temperature at which the mercury will remain vaporized by means of the selection of gases within the tube. When the lowest temperature at which the tube light is to be run is determined, the relative proportions of the two or more gases to comprise the mixture may be selected. For instance, a tube light containing 30% neon and 70% helium with the necessary amount of mercury and krypton or xenon in an amount corresponding to a pressure of one half a millimeter, will maintain its blue color down to a temperature of −28° F. when the pressure of the tube contents is 7½ millimeters. The change may be delayed until the temperature falls to −41° F. by increasing the tube pressure to fifteen millimeters and to −49° F. by increasing the pressure of the tube contents to thirty millimeters.

As an example the tube contents may comprise neon and helium in the relation of 30% neon, and 70% helium, one-half millimeter krypton or xenon and the usual amount of mercury so that the tube pressure amounts to fifteen millimeters. This mixture will maintain the desired blue color until the temperature falls to about −41° F.

It will thus be seen that a positive column tube emitting a blue color is maintained at very low temperatures, much lower than would be possible by the use of a single gas with mercury and that by a selection of the number and quantity of the gases the temperature at which the tube will lose its blue color may be controlled.

Various modifications will occur to those skilled in the art in the composition, proportion and pressure of the gases contained within the positive column tube in conjunction with mercury and no limitation is intended by the phraseology or proportions except as set forth in the appended claims.

What I claim is:

1. In a positive column tube, a mixture adapted to maintain substantially its color at low temperatures comprising mercury, krypton, a heat supplying rare gas, and neon.

2. In a positive column tube, a mixture adapted to maintain substantially its color at low temperatures comprising mercury, krypton, a rare gas having a high voltage gradient, and neon.

3. In a positive column tube, a mixture adapted to maintain substantially a blue color at low temperatures comprising mercury, krypton and helium.

4. In a positive column tube, a mixture adapted to maintain substantially a blue color at low temperatures comprising mercury, krypton, helium and neon.

5. In a positive column tube, a mixture adapted to maintain substantially a blue color at low temperatures comprising mercury, krypton, helium and a rare gas as a diluent.

6. A positive column tube adapted to emit a desired color at low temperatures, the tube contents comprising one or more color emitting vapors, helium and kryton.

7. A positive column tube adapted to emit a desired color at low temperatures, the tube contents comprising one or more color emitting vapors, a rare gas having a high voltage gradient, krypton, and neon.

LEO L. BECK.